United States Patent [19]

Yamamoto

[11] Patent Number: 4,599,734

[45] Date of Patent: Jul. 8, 1986

[54] SPACE DIVERSITY COMMUNICATIONS SYSTEM FOR MULTI-DIRECTION TIME DIVISION MULTIPLEX COMMUNICATIONS

[75] Inventor: Kazuhiro Yamamoto, Tokyo, Japan

[73] Assignee: NEC Corporation, Tokyo, Japan

[21] Appl. No.: 720,090

[22] Filed: Apr. 5, 1985

[30] Foreign Application Priority Data

Apr. 10, 1984 [JP] Japan .................................. 59-72364

[51] Int. Cl.$^4$ ............................................ H04B 7/06
[52] U.S. Cl. ..................................... 375/40; 370/104;
455/52; 455/69; 455/101
[58] Field of Search .................... 370/104; 455/12, 13,
455/52, 63, 69, 101, 129; 371/5, 8; 375/38, 40,
100

[56] References Cited

U.S. PATENT DOCUMENTS

| 3,095,538 | 6/1963 | Silberstein | 455/12 |
| 3,582,879 | 6/1971 | Sullivan | 455/69 |
| 4,099,121 | 7/1978 | Fang | 375/40 |

Primary Examiner—Benedict V. Safourek
Attorney, Agent, or Firm—Laff, Whitesel, Conte & Saret

[57] ABSTRACT

A space diversity communications system usable with a multi-direction time division multiplex communications network which consists of a plurality of scattered satellite stations and one central station. While the central station is provided with a single antenna, each satellite station is provided with two antennas, main and supplementary. The central station, responsive to received signal, produces a control signal for each satellite station and sends it the satellite station. The satellite station selects either of two antennas in response to the control signal, thereby increasing radio transmission quality on a satellite-by-satellite basis.

6 Claims, 5 Drawing Figures

SPACE DIVERSITY COMMUNICATIONS SYSTEM FOR MULTI-DIRECTION TIME DIVISION MULTIPLEX COMMUNICATIONS

BACKGROUND OF THE INVENTION

The present invention relates to a space diversity communications system for a mutli-direction time division multiplex (MD-TDM) communications network, which consists of a number of scattered satellite stations and one common central station.

In a conventional MD-TDM communications network, time division multiplexed (TDM) signals are simultaneously transmitted to a plurality of satellite stations in a continuous mode. Each satellite station, on the other hand, transmits burst signals to the central station in a time slot assigned thereto and synchronized to a clock at the central station. The burst signals from the respective satellite stations are regularly aligned in a time sequence at the central station so as to be identified and reproduced according to the clock at the central station.

In such an MD-TDM communications sytem, where the transmission path between the central station and a given satellite station extends over a long distance or a sea, the radio transmission quality requires compensation preferably by the use of a space diversity system.

Meanwhile, as a space diversity system in two-way communications between two geographically separated stations, there is available a baseband switching system in which signals received from a main and a supplementary antennas are separately demodulated, and whichever demodulated signal having a lower bit error rate is selected.

The problem encountered with this switching sysem is that, if it is directly applied to the previously mentioned MD-TDM communications sytem, the central station which is receiving signals from a plurality of satellite stations has to monitor the channel conditions and control the radio transmission quality for each satellite station.

Furthermore, where a main and a supplementary antennas are installed in the central station, difficulty is experienced in response to a need for space diversity communication between satellite stations in selecting an optimum distance between the two antennas for the respective satellite stations to which different communications paths are assigned, resulting in a limited space diversity effect.

SUMMARY OF THE INVENTION

It is therefore an object of the present invention to provide a space diversity communications system for MD-TDM communications which attains a sufficient space diversity effect.

It is another object of the present invention to provide a space diversity communications system for MD-TDM communications which, if any of satellite stations in an MD-TDM communications network has been put under poor transmission conditions, can compensate the transmission conditions independently of the other satellite stations.

It is another object of the present invention to provide a space diversity communications system for MD-TDM communications which frees a central station from limitations otherwise imposed on the installation of antennas for achieving a space diversity effect.

It is another object of the present invention to provide a space diversity communications system for MD-TDM communications which solves the problem of selecting a distance between a main and a supplementary antennas at a central station by installing a supplementary antenna not in the central station but in each satellite station.

It is another object of the preseent invention to provide a space diversity communications system for MD-TDM communications which realizes an optimum space diversity effect for each of the sections associated with the individual satellite stations.

It is another object of the present invention to provide a generally improved space diversity communications system for MD-TDM communications.

While an example of a space diversity communications system of the kind described has already been proposed in U.S. patent application Ser. No. 494,116, filed May 13, 1983, now Pat. No. 4,530,087 and assigned to the same assignee as the present invention, the present invention proposes other new and useful embodiments.

In one aspect of the present invention, there is provided a space diversity communications system for a time division multiplex communications network having one central station and a plurality of satellite stations, each of the satellite stations comprising a transmitter for transmitting a burst signal to the central station within a time slot assigned to the satellite station, the central station comprising a receiver for time-sequentially receiving the burst signals from the respective satellite stations. The transmitter at any of the satellite stations which needs diversity communications comprises two antennas, one transmitter unit for applying the burst signal selectively to the two antennas, and a transmission signal switching circuit for causing the transmitter unit to select one of the two antennas which is to receive the burst signal, in response to a control signal which is applied from the central station and within a time slot other than those during which burst signals assigned to the satellite station are to be transmitted to the central station. The reciever at the central station comprises a demodulator for demodulating the received burst signal, and an error pulse generator for generating error pulses by detecting a bit error rate of the demodulated burst signal for each of the satellite stations which needs the diversity communications. The central station further comprises a control signal generator for generating the control signal in response to the error pulses, and a signal transfer circuit for transferring the generated control signal to any of the satellite stations which is associated with the detected error pulses.

In another aspect of the present invention, there is provided a space diversity communications system for a time division multiplex communications network having one central station and a plurality of satellite stations, each of the satellite stations comprising a transmitter for transmitting a burst signal to the central station within a time slow assigned to the satellite station, the central station comprising a receiver for time-sequentially receiving the burst signals from the respective satellite stations. The transmitter at any of the satellite stations which needs diversity communications comprises a first and a second antennas, a first and a second transmitter units interconnected repectively to the first and second antennas for applying the burst signal to the interconnected antennas, and a transmission signal switching circuit for causing the transmitter to select one of the first and second antennas which is to transmit the burst signal to the central station therethrough, in rsponse to a control signal which is applied from the central station and within a time slot other than those during which burst signals assigned to the satellite station are to be transmitted to the central station. The receiver at the central station comprises a demodulator for demodulating the received burst signal, and an error pulse generator for generating error pulses by detecting a bit error rate of the demodulated burst signal for each of the satellite stations which needs the diversity communications. The central station further comprises a control signal generator for generating the control signal in response to the error pulses, and a signal transfer circuit for transferring the generated control signal to any of the satellite stations which is associated with the detected error pulses.

The above and other objects, features and advantages of the present invention will become apparent from the following detailed description taken with the accompaying drawings.

DESCRIPTION OF THE PREFERRED EMBODIMENTS

While the space diversity communications system for MD-TDM commumucations of the present invention is susceptible of numerous physical embodiments, depending upon the environment and requirements of use, substantial numbers of the herein shown and described embodiments have been made, tested and used, and all have performed in an eminently satisfactory manner.

To better understand the present invention, the general construction and operation of an MD-TDM communications network to which the present invention is applicable will be described first.

Figure 1:
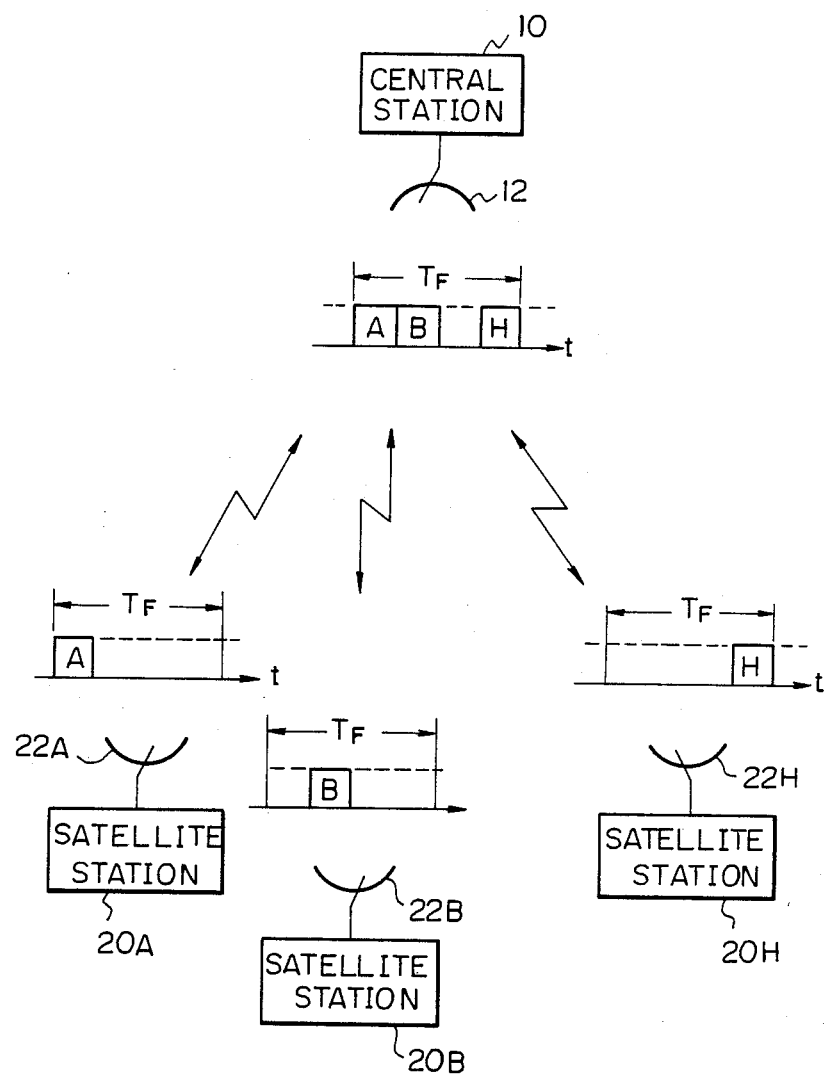
FIG. 1 is a diagram schematically showing the construction and operation of an MD-TDM communications network.

Referring to FIG. 1 of the drawings, an MD-TDM communications network includes a central station 10 and a plurality of scattered satellite stations 20A, 20B, . . . and 20H. TDM signals are transmittd simultaneously and in a continuous mode from the central station 10 to the satellite stations 20A, 20B . . . and 20H through an antenna 12. Meanwhile, each satellite station 20A, 20B . . . 20H, in synchronism with a clock at the central station 10, transmits burst signals to the central station 10 in a time slot A, B. . . . or H assigned thereto, so that burst signals from the satellite stations are regularly aligned in a time sequence $T_F$ along a time axis t at the central station 10, with the result that burst signals from any satellite station can be readily identified and reproduced according to the clock at the central station.

Figure 2:
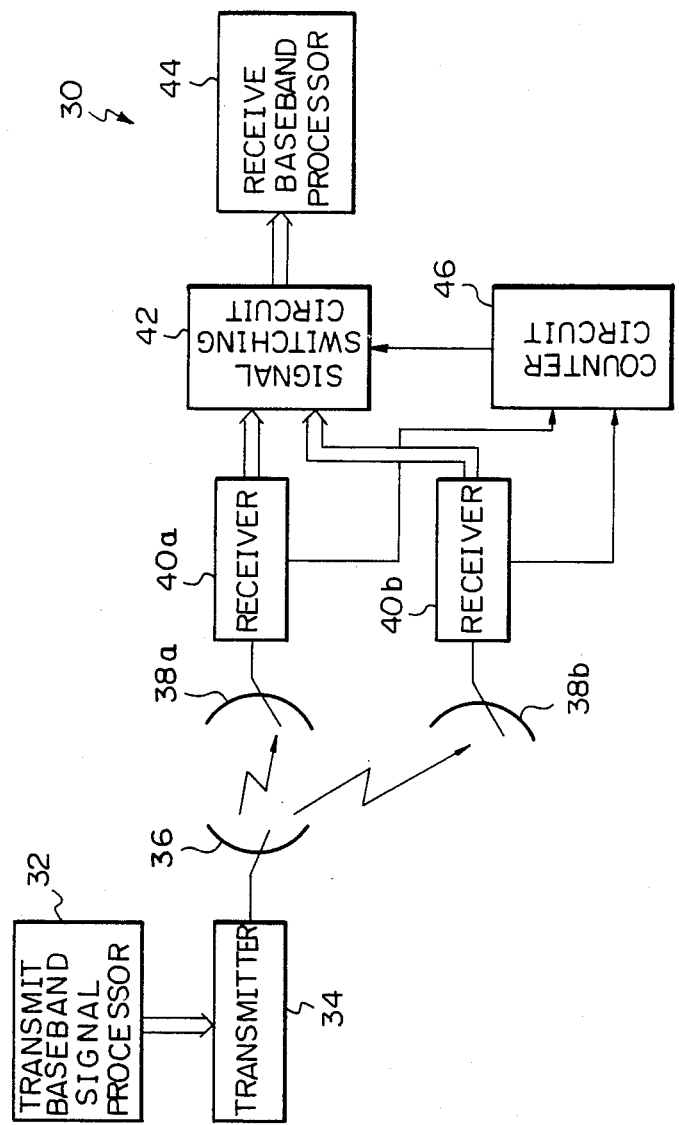
FIG. 2 is a block diagram of a prior art baseband switching device.

As discussed earlier, in the case where any of the satellite station 20A, 20B, . . . and 20H has to communicate with the central station 10 over a long transmission path or across a sea, the network is required to adopt a space diversity system in order to compensate the radio transmission quality. For example, as a space diversity system in two-way commuications between two remote stations, a baseband switching system is available in which signals received from a main and a supplementary antennas are separately demodulated, and whichever demodulated signal having a lower bit error rate is selected. Specifically, as shown in FIG. 2, a baseband switching system, generally 30, consists of a transmit baseband signal processing circuit 32, a transmitter 34 provided with an antenna 36, receivers 40a and 40b for receiving signals coming in through a main antenna 38a and a supplementary antenna 38b, respectively, a signal switching circuit 42 for switching baseband signals demodulated by the receivers 40a and 40b, a receive baseband signal processing circuit 44, and a competitive counter circuit 46 for generating a switching control signal to control the signal switching circuit 42.

However, this baseband switching system has the disadvantage that, as previously stated, the central station 10 which is receiving signals form the satellite stations 20A, 20B, . . . and 20H needs to monitor the channel conditions and control the radio transmission quality for each satellite station. In addition, the baseband switching system cannot afford a satisfactory space diversity effect because, if both the main and supplementary antennas are installed in the central station 10, it is generally difficult to select an optimum distance between the main and supplementary antennas for each satellite station whose transmission path is separate from the others.

Hereinafter will be described preferred embodiments of the space diversity communications system in accordance with the present invention.

Figure 3:
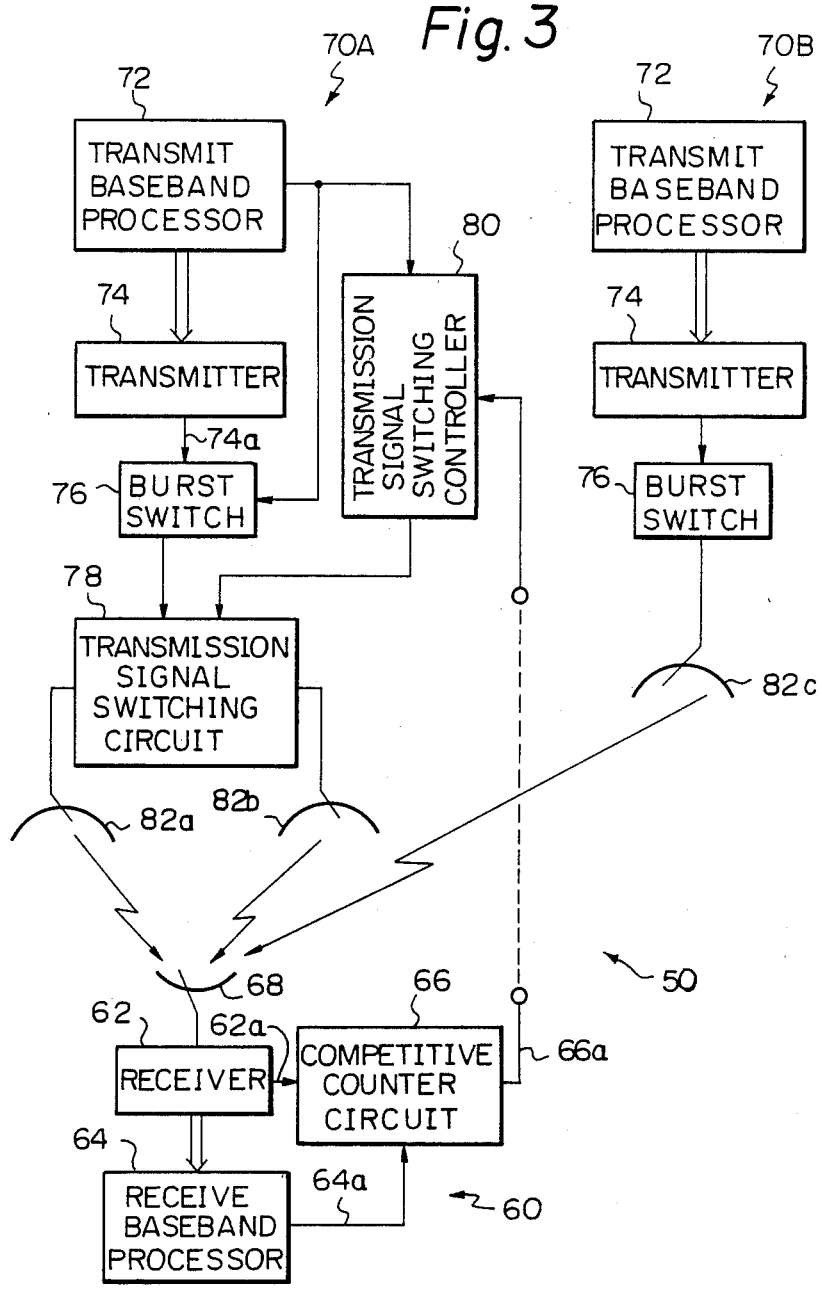
FIG. 3 is a block diagram showing an MD-TDM communications network to which a space diversity communications system embodying the present invention is applied.
Figure 4:
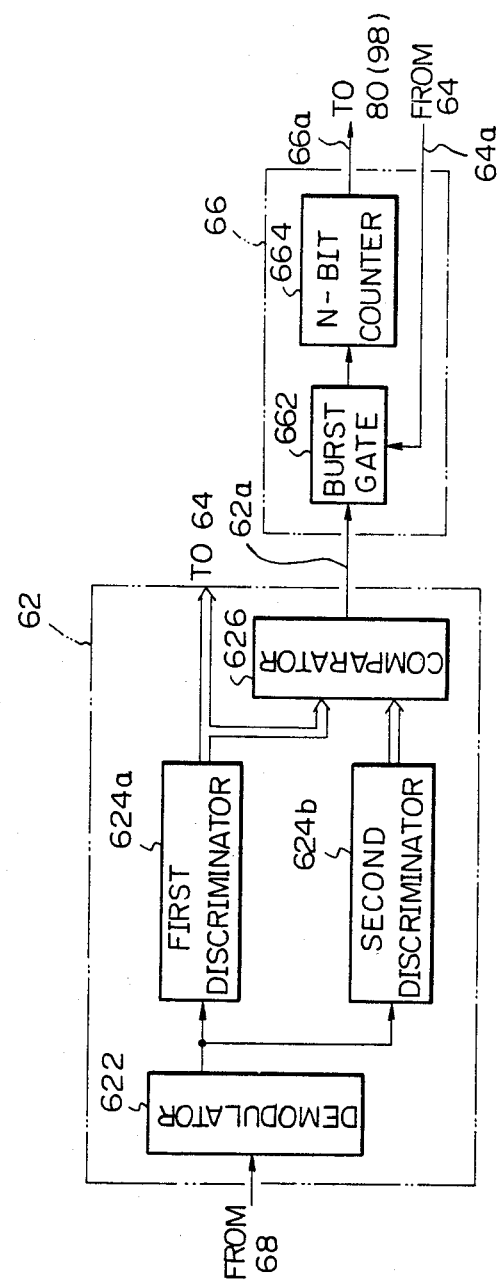
FIG. 4 is a block diagram showing the constructions of a receiver and a counter circuit each included in the system of FIG. 3.

Referring to FIGS. 3 and 4, a space diversity system embodying the present invention is shown and generally designated by the reference numberal 50. as shown, the system 50 comprises a central station 60 and a plurality of satellite stations 70A, 70B and so on, which are identical in construction with each other. The statellite station 70A by way of example consists of a transmit baseband signal processing circuit (hereinafter referred to as a transmit signal processor for simplicity) 72, a transmitter 74, a burst on/off switch circuit (hereinafter referred to as a burst switch circuit) 76, a transmission signal switching circuit 78, a transmission signal switching controller 80, a main antenna 82a, and a supplementary antenna 82b. The central station 60, on the other hand, is made up of a receiver 62, a receive baseband signal processing circuit (hereinafter referred to as a received signal processor) 64, a competitive counter circuit (hereinafter referred to as a counter circuit) 66, and an antenna 68. As shown in detail in FIG. 4, the receiver 62 comprises a demodulator 622, discriminators 624a and 624b, and a comparator 626. The counter circuit 66 comprises a burst gate circuit 662 and a counter 664.

The transmit signal processor 72 has a first output applied to an input of the transmitter 74 the output of which in turn is applied to a first input of the burst switch circuit 76. A second output of the transmit signal processor 72 is routed to a second input of the burst switch circuit 76 as well as to a first input of the transmission signal switching controller 80. An output of the burst switch circuit 76 is coupled to a first input of the transmission signal switching circuit 78, while an output of the transmission signal switching controller 80 is applied to a second input of the transmission signal switching circuit 78. A first output of the transmission signal switching circuit 78 is applied to an input of the main antenna 82a. A second input of the transmission signal switching circuit 78 is routed to an input of the supplementary antenna 82b.

Signals coming out from the main antenna 82a and supplementary antenna 82b are received by the antenna 68 at the central station 60. The output of the antenna 68 is applied to an input of the received signal processor 64 of the receiver 62. The receiver 62 sends a first output to the received signal processor 64 and a second output to a first input of the counter circuit 66. The output of the received signal processor 64 is fed to a second input of the counter circuit 66 the output of which is routed to the transmission signal switching controller 80.

Inside the reciever 62, the incoming signal is applied to an input of the demodulator 622 the output of which in turn is applied to an input of the first discriminator 624a as well as to an input of the second discriminator 624b. The output of the first discriminator 624a is fed to a first input of the comparator 626 and an input of the received signal processor 64. The output of the second discriminator 624b is applied to a second input of the comparator 626. The output of the comparator 626 is fed to an input of the counter circuit 66. It is to be noted that a plurality of counter circuits 66 are associated in one-to-one correspondence with all the satellite stations which need diversity communications.

In the counter 66, the first input is routed to a first input of the burst gate circuit 662, and the second input to a second input of the burst gate circuit 662. The output of the burst gate circuit 662 is applied to an input of the counter 664 the output of which constitutes an output of the counter 66.

In operation, the counter circuit 66 counts up error pulses 62a, which are applied thereto from the receiver 62, within a specific burst time slot assigned to each satellite station and in response to burst timing pulses 64a, which are provided by a timing generator built in the signal processor 64. When the burst time slot assigned to the satellite station 70A is over, the counter circuit 66 holds the then existing count. As the next burst time slot particular to the statellite station 70A is reached, the counter circuit 66 is reactivated to count up further error pulses 62a. When the counter circuit 66 reaches a predetermined count, it sends a control signal 66a to the transmission signal switching controller 80 of the satellite station 70a. The transmission of the control signal 66a from the central station 60 to the satellite station 70a is implemented by the use of an auxiliary control bit meant for the satellite station 70A and multiplexed with a baseband signal to be transmitted to the station 70A.

In the satellite station 70A which needs diversity communication, an output 74a of the transmitter 74 is applied to the burst switch circuit 76 adapted to format the signal 74a into a butst signal. The burst signal from the circuit 76 is routed to the transmission signal switching circuit 78 which then selects the main antenna 82a or the supplementary antenna 82b for the transmission of the burst signal. Meanwhile, the control signal 66a sent from the central station 60 to the satellite station 70A arrives at the transmission signal switching controller 80. In response to the signal 66a, the controller 80 has its switching circuit 78 driven to select a live antenna. This switching action does not occur during burst signal transmission periods and occurs on a burst-by-burst basis. That is, it completes within intervals between bursts excluding the time slots assigned to the satellite station 70A.

In the meantime, because the receiving arrangement at the satellite station 70a receives signals in a continuous mode as previously mentioned, it is capable of adopting the prior art diversity system which has been described with reference to FIG. 2 and, therefore, it can be implemented with a two-way diversity system which commonly uses the antennas 82a and 82b at the satellite station 70A.

Referring to FIG. 4 in particular, the process of generation of the control signal 66a will be explained. As stated earlier, the receiver 62 is made up of the burst demodulator 622, first discriminator 624a, second discriminator 624b intentionally provided with a higher bit error rate, and comparator 626 adapted to compare outputs of the discriminators 624a and 624b to generate error pulses 62a. As the error rate begins to increase, the comparator 626 delivers error pulses 62a in response to outputs of the discriminators 624a and 624b. The counter circuit 66, as also described earlier, comprises the burst gate circuit 662 and the counter 664 having N bits; N being a value suitably selected in consideration of a detection time before switching. On increment to N bits, the counter 664 is caused to send a control signal 66a to the satellite station 70A and, at the same time, reset to become ready to count error pulses 62a starting from a burst which appears just after antenna switching at the station 70A.

The alternative method for generation of the control signal 66a is a parity technique. The transmit baseband signal processor 72 of each satellite station inserts parity bits into a baseband data train. The received signal processor 64 functions to detect and count the parity bits satellite by satellite so as to generate the control signals.

Figure 5:
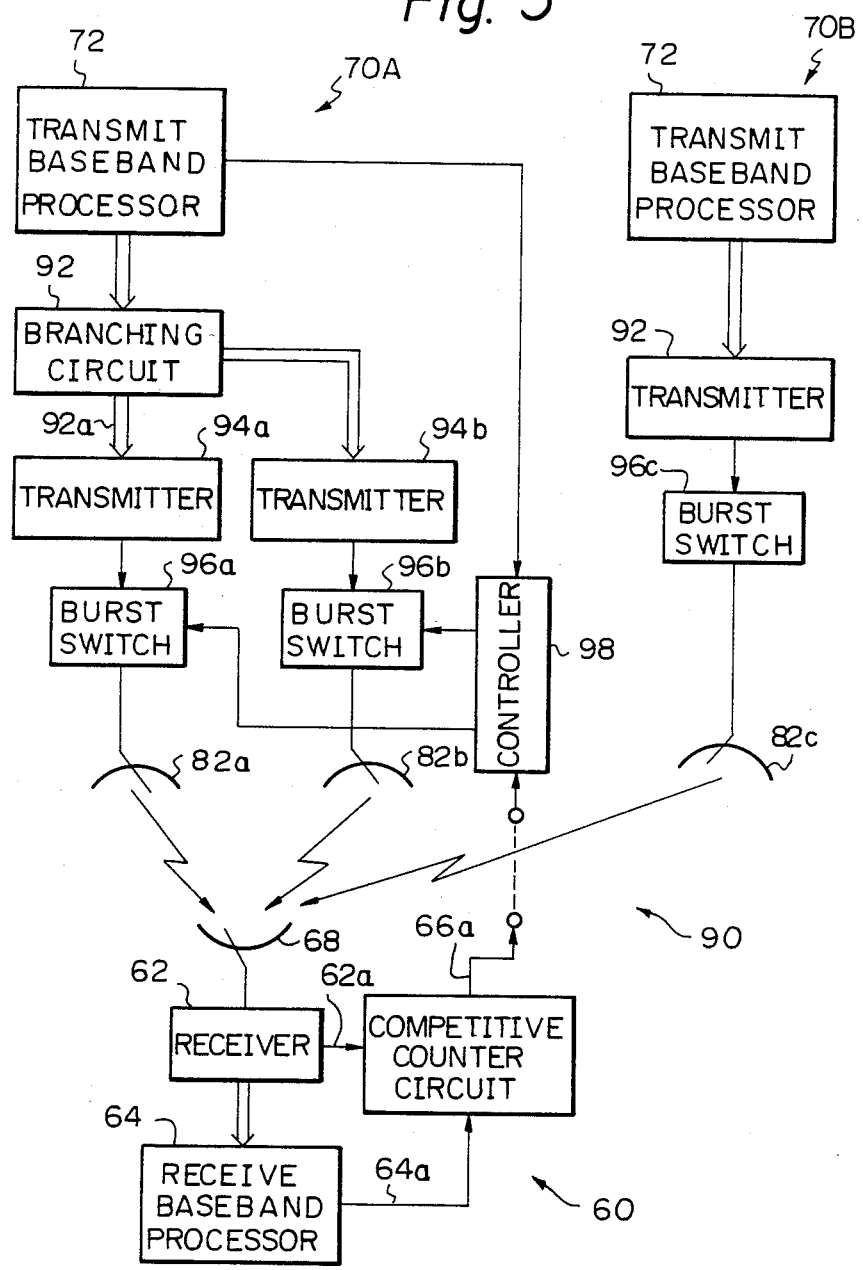
FIG. 5 is a block diagram showing another embodiment of the system of the present invention.

Referring to FIG. 5, another embodiment of the present invention is shown in which the same structural elements are designated by like reference numerals. In the system, generally 90, shown in FIG. 5, while the central station 60 shares the same construction as that of the first embodiment, the satellite station 70A, unlike that of the first embodiment, includes a branching circuit 92 adapted to branch the output of the transmit signal processor 72. The branching circuit 92 delivers identical synchronous baseband signals 92a to a first transmitter 94a and a second trasmitter 94b each for modulation. the outputs of the transmitters 94a and 94b respectively are applied to their associated burst switch circuits 96a and 96b which then lead them to the main antenna 82a and supplementary antenna 82b, respectively. A controller 98, responsive to a control signal 66a from the central station 60, controls the burst switch circuits 96a and 96b in synchronism with burst timings. Any satellite station, such as 70A, the bit error rate of which has been determined and increased by the central station 60 is caused to turn off its output and, instead, transmit burst signals from any antenna which has been turned off until that time.

It will be noted that the implementation for the transmission of control signals is not limited to thsoe used in the embodiments and may be a one which transmits them over analog transmission paths by applying a low degree of modulation to a carrier which is to be transmitted frm a central station.

In summary, it will be seen that the present invention provides a space diversity system for an MD-TDM communications network which can compensate radio transmission quality associated with any particular satellite station independently of the others when the satellite station is put under poor transmission conditions. Another advantage of the system of the present invention is that due to the absence of a supplementary antenna at a central station the system is free from the need for selecting a main-to-supplementary antenna distance, which has heretofore been brought about for a higher space diversity effect. Still another advanage is that because each satellite station is provided with a supplementary antenna, the system may be constructed in such a manner as to set up an optimum diversity effect on a satellite-by-satellite basis, more enhancing the compensation of radio transmission quality. In addition, the system is free from momentary interruptions of data signal transmission inasmuch as antenna switching at each satellite station occurs in time slots except for those assigned to that particular station.

Various modifications will become possible for those skilled in the art after receiving the teachings of the present disclosure without departing from the scope thereof.

What is claimed is:

1. A space diversity communications system for a time division multiplex communications network having one central station and a plurality of satellite stations, each of the satellite stations comprising a transmitter for transmitting a burst signal to the central station within a time slot assigned to the satellite station, the central station comprising a receiver for time-sequentially receiving the burst signals from the respective satellite stations,
   (a) said transmitter at any of the satellite stations which needs diversity communications comprising:
      two antennas;
      one transmitter unit for applying the burst signal selectively to said two antennas; and
      transmission signal switching means for causing said transmission unit to select one of the two antennas which is to receive the burst signal, in response to a control signal which is applied from the central station and within a time slot other than those during which burst signals assigned to the satellite station are to be transmitted to the central station,
   (b) said receiver at the central station comprising:
      demodulator means for demodulating the received burst signal; and
      error pulse generator means for generating error pulses by detecting a bit error rate of the demodulated burst signal for each of the satellite stations which needs the diversity communications,
   (c) the central station further comprising:
      control signal generator means for generating the control signal in response to the error pulses; and
      signal transfer means for transferring the generated control signal to any of the satellite stations which is associated with the detected error pulses.

2. A space diversity communications system as claimed in claim 1, wherein the error pulse generator means comprises a first and a second discriminators each being supplied with the demodulated burst signal, and a comparator for comparing outputs of said first and second discriminators to generate the error pulses when the bit error rate of the burst signal increases.

3. A space diversity communications system as claimed in claim 2, wherein the control signal generator means and the control signal transfer means comprise burst gate means to which the error pulses are applied, and a counter supplied with outputs of said burst gate means to generate the control signal and transmit the control signal to the satellite station when said counter is incremented a predetermined number of bits.

4. A space diversity communcations system for a time division multiplex communications network having one central station and a plurality of satellite stations, each of the satellite stations comprising a transmitter for transmitting a burst signal to the central station within a time slot assigned to the satellite station, the central station comprising a receiver for time-sequentially receiving the burst signals from the respective satellite stations,
   (a) said transmitter at any of the satellite stations which needs diversity communications comprising:
      a first and a second antennas;
      a first and a second transmitter units interconnected respectively to said first and second antennas for applying the burst signal to said interconnected antennas; and
      transmission signal switching means for causing said transmitter to select one of the first and second antennas which is to transmit the burst signal to the central station therethrough, in response to a control signal which is applied from the central station and within a time slot other than those during which burst signals assigned to the satellite station are to be transmitted to the central station,
   (b) said receiver at the central station comprising:
      demodulator means for demodulating the received burst signal; and
      error pulse generator means for generating error pulses by detecting a bit error rate of the demodulated burst signal for each of the satellite stations which needs the diversity communications,
   (c) the central station further comprising:
      control signal generator means for generating the control signal in response to the error pulses; and
      signal transfer means for transferring the generated control signal to any of the satellite stations which is associated with the detected error pulses.

5. A space diversity communications system as claimed in claim 4, wherein the error pulse generator means comprises a first and a second discriminators each being supplied with the demodulated burst signal, and a comparator for comparing outputs of said first and second discriminators to generate the error pulses when the bit error rate of the burst signal increases.

6. A space diversity communications system as claimed in claim 5, wherein the control signal generator means and the control signal transfer means comprise burst gate means to which the error pulses are applied, and a counter supplied with outputs of said burst gate means to generate the control signal and transmit the control signal to the satellite station when said counter is incremented a predetermined number of bits.

* * * * *